United States Patent [19]

Krueger et al.

[11] Patent Number: 4,841,540
[45] Date of Patent: Jun. 20, 1989

[54] GAS LASER ARRANGEMENT

[75] Inventors: Hans Krueger, Munich; Herbert Lamprecht, deceased, late of Munich; by Thekla Lamprecht, heir; by Simon Lamprecht, heir, both of Landsberg/Lech; Wilhelm Tiemann, Bubenreuth, all of Fed. Rep. of Germany

[73] Assignee: Siemens Aktiengesellschaft, Berlin and Munich, Fed. Rep. of Germany

[21] Appl. No.: 250,237

[22] Filed: Sep. 28, 1988

[30] Foreign Application Priority Data

Sep. 28, 1987 [DE] Fed. Rep. of Germany ....... 3732637

[51] Int. Cl.⁴ .............................................. H01S 3/097
[52] U.S. Cl. ...................................... 372/86; 372/38; 372/85
[58] Field of Search ...................... 372/86, 38, 85, 55, 372/81

[56] References Cited

U.S. PATENT DOCUMENTS

| | | | |
|---|---|---|---|
| 3,753,144 | 10/1965 | Kearns | 372/62 |
| 3,806,762 | 4/1974 | Punis et al. | 372/38 |
| 4,378,600 | 3/1983 | Hobart | 372/62 |
| 4,541,097 | 9/1985 | Kuwabara et al. | 372/87 |

*Primary Examiner*—Léon Scott, Jr.
*Attorney, Agent, or Firm*—Hill, Van Santen, Steadman & Simpson

[57] ABSTRACT

A gas laser arrangement includes a discharge tube arranged between a cathode and anode and including a central discharge channel and at least one gas return channel. An auxiliary electrode for pre-discharge is allocated to the cathode, the auxiliary electrode being connected to an operating voltage source through a resistor.

6 Claims, 3 Drawing Sheets

GAS LASER ARRANGEMENT

BACKGROUND OF THE INVENTION

1. Field of the Invention

The present invention is directed generally to a gas laser arrangement including a discharge tube disposed between a cathode and an anode, the discharge tube being provided with a discharge channel and at least one gas return channel.

2. Description of the Related Art

As is known, gas lasers, for example, argon ion lasers generate an output power of up to several watts in the visible and UV-range which is suitable for use as a light source for scientific and industrial applications including in spectroscopy, holography, and non-destructive materials testing as well as being suitable for use in eye and skin surgery. In a gas laser, a gas discharge is ignited in the discharge channel of the discharge tube between a cathode and an anode. The discharge tube is generally composed of an electrically insulating material which may be, for example, a ceramic such as beryllium oxide (BeO), aluminum nitride (A1N) or aluminum oxide ($Al_2O_3$) silicon oxide (SiC) and silicon nitride ($Si_3N_4$). The discharge tube can also be composed of a cascade, or succession, of metal discs and insulators. The gas discharge channel in the discharge tube is in the form of a capillary bore having a diameter generally of not more than 3 mm. A gas return channel is provided either as an internal or external connecting channel relative to the discharge tube and extending between the anode space and the cathode space through which gas flows for pressure equalization.

In a known embodiment of a gas laser for generating relatively low power, for example, a ceramic tube is provided for use as a discharge tube the ceramic tube including metallic cooling ribs to eliminate heat. In another embodiment having what is referred to as a stacked structure, the discharge tube is alternately formed of ceramic rings and metallic cooling discs which are each provided with a central bore and are stacked on top of one another in alternation so that the central bores form a discharge channel. In this arrangement, internal gas return paths are formed by a plurality of gas return chanels arranged in the discharge tube parallel to the discharge channel. See, for example, U.S. Pat. No. 3,753,144.

A further embodiment of a gas laser for high power use includes a cathode space, a discharge channel, and an anode space are all surrounded by a common discharge tube having a relatively thin wall of ceramic which is cooled by water. The discharge channel is formed of a greater plurality of pot-shaped, or cup-shaped, metal elements, each of which is provided with a central bore in the base thereof. The metal elements are arranged in succession of the discharge tube. The bores in the cup-shaped elements together form a central discharge channel and are each surrounded by the hollow cylindrical projection or wall of the cup-shaped metal elements. In the region of the bore, a part of the floor or base of the cup-shaped metal elements is composed of a sputter-resistant material such as tungsten. To provide for gas return, the metal elements include additional bores in the region of their edges. In the outer edge region, the metal elements are soldered to the inside wall of the discharge tube. See, for example, U.S. Pat. No. 4,378,600.

SUMMARY OF THE INVENTION

An object of the present invention is to improve ignition behavior in gas lasers and particularly in argon and krypton ion lasers. More specifically, misfirings in the gas return channels or failure of the laser ignition is to a large extent avoided by the apparatus according to the present invention so that the useful life of a gas laser arrangement is not limited by ignition problems.

The present invention is based upon the perception that charge carriers can be lost due to wall impacts in the relatively narrow and long bore of the discharge channel during the build up, or start up, phase of the discharge. The loss of charge carriers makes ignition during the build up of the discharge more difficult. In more detail, the discharge channel can change under the influence of the arc after a relatively long operating duration of the gas laser arrangement. For example, the wall of the bore can erode due to ion sputtering events, or contamination zones can be formed thereon which are at least partly composed of metal deposits. These changes lead to the possibility that the discharge no longer ignites or that a misfiring occurs through the gas return channels. After a long operating duration, aging of the cathode as well as possible gas contamination also contribute to problems.

A solution of these problems is inventively achieved according to this invention by allocating an auxiliary electrode to the cathode for pre-discharge wherein the auxiliary electrode is connected to an operating voltage source through a resistor. The auxiliary electrode for a glow pre-discharge generates an increaed spatially extensive pre-ionization in the cathode space before the punch-through of the main discharge through the discharge channel. In an especially simple embodiment of the invention, the metallic part of the cathode housing which is, for example, a metal flange, is also provided as the auxiliary electrode. A separate auxiliary voltage source is not required in some embodiments when the auxiliary electrode is connected to the anode through a resistor, and particularly a high impedance resistor. Thus, the anode voltage also serves as the operating voltage source for the pre-discharge.

DESCRIPTION OF THE PREFERRED EMBODIMENTS

Figure 1:
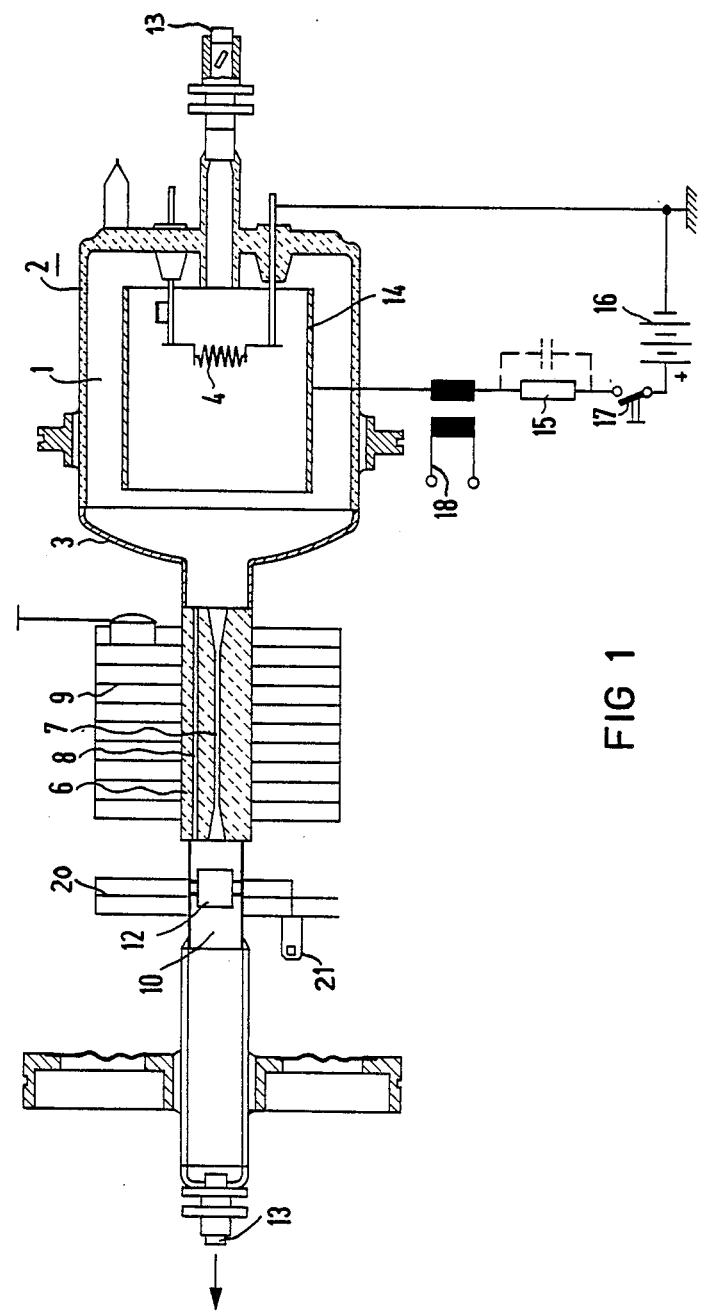
FIG. 1 is a longitudinal cross section of a gas laser arrangement according to the principles of the present invention including a special auxiliary electrode in the cathode space.

In the embodiment of FIG. 1, a cathode space 1 of a gas laser arrangement is surrounded by a cathode housing 2 which is partially composed of glass or ceramic and is provided with a metal flange 3. The cathode space 1 is in the region of a cathode 4 which is in the form of a heating coil. The metallic flange 3 is connected to one end of a discharge tube 6 that is preferrably composed of ceramic such as, for example, berylium oxide (BeO), aluminum oxide $Al_2O_3$ or aluminum nitride A1N. The discharge tube 6 is provided with a central bore forming a discharge channel 7 and further including a plurality of gas return channels 8, only one of which is shown in FIG. 1. The gas return channel 8 is shown in the discharge tube 6 thereby forming a compact structure but can be outside the tube 6 as well. Metallic cooling ribs or fins 9 are mounted on the external surface of the ceramic discharge tube 6 to carry heat away from the tube 6. An anode space 10 is in the region of an anode 12 of the gas laser arrangement, the anode space 10 being surrounded by a metallic anode housing 11 that can likewise be provided with cooling ribs 20 (not shown in detail) for heat elimination. At opposite ends of the gas laser arrangement are provided mirrors 13 forming an optical resonator. The laser arrangement is tightly sealed to contain a laser active gas.

According to the present invention, an auxiliary electrode 14 for generating a pre-discharge is provided in the cathode space 1, the auxiliary electrode 14 being connected to the cathode 4 via an ignition voltage source 18 and a high impedance resistor 15 having a resistance of, for example, approximately 5 megohms. The resistor 15 can be replaced by a resistor-capacitor combination as shown in broken outline, or can be replaced by a capacitive resistor. An operating voltage source 16 of, for example, approximately 200 through 400 volts is also provided. After the usual preheating of the cathode 4 to its operating temperature of, for example, approximately 1050° C., a low-current glow discharge is ignited between the auxiliary electrode 14 and the cathode 4 with the assistance of an ignition pulse from the ignition transformer 18. This pre-discharge produces an intensifed and spatially expansive pre-ionization in the cathode space 1. As a result thereof, the ignition of the main discharge through the discharge channel 7 to the anode 12 is made significantly easier. After the ignition of the main discharge, a plasma current flows mainly from the heating coil of the cathode 4 to the anode 12 and a weak glow current flows to the auxiliary electrode 14 which is practically negligible. The auxiliary electrode 14 can again be switched off with a switch 17 after the beginning of the main discharge, if warranted.

For igniting the main discharge, an ignition voltage pulse of, for example, 2 through 5 kV is briefly applied to the anode 12 from an ignition voltage source (not shown). Thus, an arc discharge is initiated which burns along the narrow discharge channel 7 of the discharge tube 6 to the anode 12 with a plasma current of from a few amperes up to a few tens of amperes. The gas return channels 8 serve to equalize the pressure between the cathode space 1 and an anode space 10. Due to the high current density arc discharge in discharge tube 7, the filling gas of the gas laser which is, for example, an inert gas or a gas mixture, preferrably of argon or krypton, having a pressure of approximately 1 Torr is excited to laser activity. The resulting laser beam departs the system through the out coupling mirror 13, as indicated by an arrow in FIG. 1.

Figure 2:
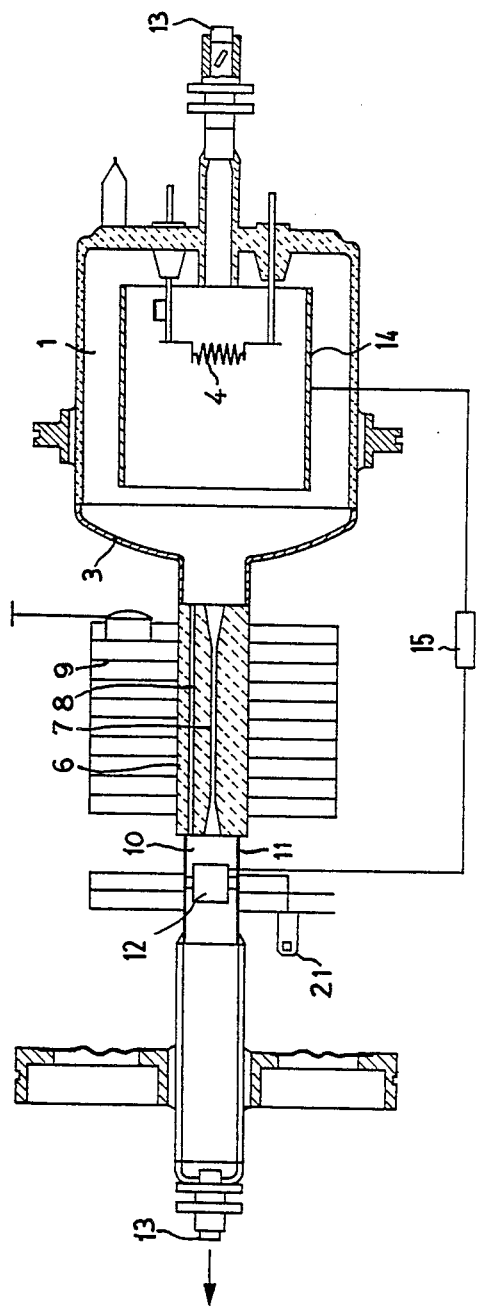
FIG. 2 is a longitudinal cross section of a further simplified embodiment of the invention with the anode voltage utilized as the operating voltage source for pre-discharge.

A simplified embodiment of the present invention according to FIG. 2 uses an anode voltage, applied through an anode lead 21 to the anode 12, as the auxiliary voltage source. In FIG. 2, similar elements to those of FIG. 1 have been given identical reference numerals. The auxiliary electrode 14 for pre-discharge is connected through the resistor 15 to the metallic housing 11 of the anode 12 or directly to the anode 12. This auxiliary voltage source simultaneously assumes the function of the ignition voltage source 18 and the operating voltage source 16 of FIG. 1. The resistor 15 in FIG. 2 and FIG. 3 can also be a mixed ohmic-capacitive resistor or only a capacitive resistor. The pre-discharge between the auxiliary electrode and the cathode is then more or less short-lived. With this embodiment, the separate operating voltage source and ignition voltage source are unnecessary.

Figure 3:
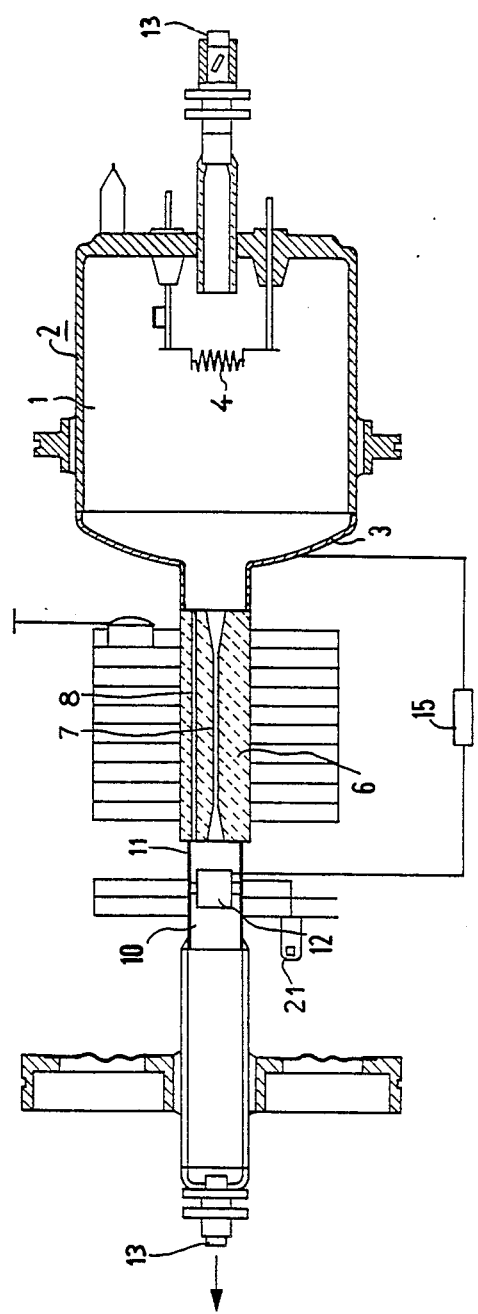
FIG. 3 is a longitudinal cross section of a further embodiment showing the use of a metallic part of the cathode housing of the auxiliary electrode.

A further simplification of the invention is provided according to the embodiment shown in FIG. 3 wherein the cathode housing 2 is at least partially composed of metal. The metallic housing part and at least the flange portion 3 is connected through the resistor 15 to the anode housing or to the anode 12. In this embodiment, the flange 3 serves as the auxiliary electrode for the pre-discharge.

Thus, there is disclosed a gas laser arrangement particularly for use in argon ion leasers in which ignition of the gas discharge through the central discharge channel is significantly facilitated and misfirings through the gas return channels are practically impossible.

Although other modifications and changes may be suggested by those skilled in the art, it is the intention of the inventors to embody within the patent warranted hereon all changes and modifications as reasonably and properly come within the scope of their contribution to the art.

We claim:

1. An improved gas laser arrangement having a discharge tube arranged between a cathode and anode, said discharge tube being provided with a discharge channel and at least one gas return channel, the improvement comprising:
   an auxiliary electrode in a position relative to said cathode so that an ionization is possible therebetween, and
   a resistor connecting said auxiliary electrode to an operating voltage source for generating an increased spatially extensive preionization discharge in a cathode space of said gas laser arrangement.

2. A gas laser arrangement as claimed in claim 1, wherein said resistor connects said auxiliary electrode to said anode.

3. A gas laser arrangement as claimed in claim 1, wherein said auxiliary electrode is formed by an electrically conductive part of a cathode housing.

4. A gas laser arrangement as claimed in claim 1, wherein said resistor is a capacitive resistor.

5. A gas laser arrangment as claimed in claim 1, wherein said resistor is an ohmic and a capacitive resistor.

6. A gas laser arrangement, comprising:
   a cathode;
   an anode;
   a discharge tube mounted between said cathode and said anode and having a longitudinally extending discharge channel through said discharge tube, at least one gas return channel in said discharge tube;
   an auxiliary electrode in a position relative to said cathode so that an ionization is possible therebetween for pre-discharge; and
   a resistor connecting said auxiliary electrode to an operating voltage source for generating an increased spatially has been inserted preionization discharge in a cathode space of said gas laser arrangement.

* * * * *